United States Patent [19]

Erickson

[11] Patent Number: 5,309,985
[45] Date of Patent: May 10, 1994

[54] STATIONARY CONTINUOUS MULTIMODULAR TRISORPTION HEAT PUMP

[76] Inventor: Donald C. Erickson, 1704 So Harbor La., Annapolis, Md. 21401

[21] Appl. No.: 976,467

[22] Filed: Nov. 17, 1992

[51] Int. Cl.[5] ............................................. F25B 17/08
[52] U.S. Cl. ................................ 165/104.12; 62/477; 62/478; 62/480
[58] Field of Search ...................... 165/104.12; 62/477, 62/478, 480

[56] References Cited

U.S. PATENT DOCUMENTS 4,372,376  2/1983  Nelson et al. .................. 165/104.12
4,976,117  12/1990  Crozat et al. .......................... 62/480

Primary Examiner—Albert W. Davis, Jr.

[57] ABSTRACT

Apparatus and process are disclosed for sorption heat pumping at high efficiency in a smooth and continuous manner using a multiplicity of stationary triplex sorption modules. The hermetically sealed trisorption modules, each of which contains at least two solid sorbents, are free of pumps, valves, restrictors, or any similar devices for flow control of refrigerant or sorbent. The apparatus contains no moving parts beyond a small number of control and motive devices for the heat transfer fluids. The preferred refrigerant is ammonia and the preferred sorbents are the solid type with monovariant equilibrium, e.g., $BaCl_2$, $SrCl_2$, $CaCl_2$, $MnCl_2$, $FeCl_2$ and $SrBr_2$.

The apparatus is preferably adapted for residential or small-scale commercial space-conditioning applications, and operates at double-effect efficiency in both the heating and cooling modes without inter-module heat transfer.

12 Claims, 6 Drawing Sheets

STATIONARY CONTINUOUS MULTIMODULAR TRISORPTION HEAT PUMP

BACKGROUND ART

Thermally activated heat pumps based on the absorption principle hold great promise for meeting the combined environmental goals of higher energy efficiency (reduced $CO_2$ emissions) and zero ozone depletion for space conditioning applications. However, the joint achievement of high efficiency, simplicity, and low cost has proved to be elusive.

The use of solid sorbents in single-effect intermittent cycle heat pumps or refrigerators is well known. Solid sorbent use presents the advantages that no sorbent or refrigerant pumps or valves are required (in certain configurations) and the sorbent is reasonably well localized. There are, however, many disadvantages: high latent heat of sorption causes very low coefficient of performance (COP); achieving continuous heat flow requires multiple units connected via complex valving arrangements; the heat release rate tends to be highly uneven, and that coupled with the periodic requirement to change between absorb and desorb results in substantial idle or lightly loaded periods. To compensate for the light load periods, the apparatus must be highly loaded the remainder of the time, and the highly loaded periods determine the heat exchange surface requirements. An additional disadvantage for solid absorbents is their monovariant equilibrium, i.e., pressure is solely a function of temperature, and not of refrigerant (sorbate) content. Thus each solid absorbent (or more accurately each sorbing pair) operates at a unique lift, and if the lift requirement changes, e.g., due to varying ambient temperature, the sorbent cannot adjust. Yet another problem with historical solid sorbent heat pumps was that the characteristic extreme sorbent volume changes (shrinking and swelling) caused the sorbent bed to compact and deactivate. That problem was largely overcome by additions either viscous liquid ($LiNO_3$) or of various inert conductive media, especially intricate porous structure such as activated carbon. Prior art disclosures of those solutions are found in U.S. Pat. Nos. 2,986,525 and 4,595,774.

For direct-fired space-conditioning applications, the most severe limitation of single-effect solid sorbent intermittent cycles is the low COP. As a result, various multi-effect cycles have been proposed. Unfortunately, they have also increased complexity, by any of several mechanisms: a) sorbate valves and/or throttles; b) sorbent-to-sorbent heat exchange through two heat exchange surfaces; c) complex heat transfer loop valving; d) excessive generator temperature; and e) multiple sorbent beds are interconnected in conjunction with more sorbate than one sorbent bed can hold, which risks liquefying one of the sorbent beds at shutdown or abnormal conditions (all the sorbate migrates to the highest affinity sorbent).

Examples of disclosures of multi-effect solid sorbent heat pumps and their attendant complexities from the above list are: U.S. Pat. No. 5,083,607 (bc); U.S. Pat. No. 5,057,132 (abe); U.S. Pat. No. 2,496,459 (ce); U.S. Pat. No. 5,079,928 (abcde); and U.S. Pat. No. 5,025,635 (abcde).

Rotary sorption heat pumps have been proposed. By arranging a multiplicity of single-effect intermittent cycle sorption heat pumps on a rotating frame, it is possible to achieve continuous heat pumping without either sorbent valves or heat transfer valves. Examples are disclosed in U.S. Pat. Nos. 4,478,057, 4,574,874, and 4,660,629.

The "trisorption" cycle is known in the prior art, although not by that name. It is the solid sorbent analog of a well-known liquid sorbent cycle. The liquid cycle has been referred to as the "Double Evaporation Resorption Cycle", B. A. Phillips, *ASHRAE Transactions*, Volume 82, Part 1, page 974, 1976. This cycle is characterized by achieving double-effect performance (input heat produces useful refrigerant two times) without need for internal latent heat exchange.

Hans Stymme, "Chemical Heat Pumps", Swedish Council for Building Research, S2:1982, Stockholm, Sweden, 1982 presents an early example of applying solid sorbents in this type of cycle. The essence is that there are three sorbents of differing affinity for the sorbate, and there is a three-step operating cycle, each stage involving a different pair of the three sorbents in both heat and mass exchange, and each step at a different pressure.

Uwe Rockenfeller, et al., in "Complex Compound Chemical Heat Pumps", *Proceedings of the 9th Industrial Energy Technology Conference*, Sep. 16-18, 1987, Houston, Tex., pp. 158-164 disclose that two trisorption cycle heat pumps can be operated synchronously with phase separation to achieve a nearly continuous heat duty, although with substantial fluctuations, using complex switching of the heat transfer media.

Rockenfeller et al., further disclose actual hardware for accomplishment of the quasi-continuous trisorption cycle heat pump process, at page 64 of "Feasibility of a Complex Compound Heat Pump", Gas Research Institute Report GRI-89/0279, Chicago Ill., December 1991. The schematic flowsheet discloses two reactors containing high affinity sorbent, two medium affinity sorbent reactors, plus a condenser and evaporator (the low affinity reactors), all interconnected in fluid communication via four one-way valves, one expansion valve, and one three-way valve. The six refrigerant valves plus four four-way heat transfer fluid valves are cycled synchronously to accomplish the cycle steps in the required sequence.

M. Lebrun, P. Meyer, and B. Spinner in "Coefficients de Performance de Machines a Froid Monoetagees: 0.8 a 1.6 Selon le Procede de Gestion des Chaleurs de Reaction", *Proceedings of the XVIII International Congress of Refrigeration*, Aug. 10-17, 1991, Montreal, Canada, p. 567, disclose that the low affinity media can be either a solid or simply condensed phase sorbate, and that the latter general.y yields lower Coefficients of Performance.

The prior art multi-effect systems having refrigerant valves tend to be noisy and unreliable. There may be a noisy depressurization each time the valve is repositioned, and a single leak anywhere in the system can cause the entire system to fail and release a large quantity of refrigerant. Also the unsteady power level in each step of prior art trisorption cycles causes the heat transfer fluid temperature to vary during the step, and is wasteful of fan and/or pump power.

Conversely the prior art systems without valves and with steady power levels (e.g., the rotary systems) are not multi-effect. Co-pending U.S. patent application Ser. No. 905,284 "Rotary Trisorption Heat Pump" filed by Donald C. Erickson on Jun. 26, 1992 discloses one means of avoiding all refrigerant valves and discontinuous operation while retaining double effect performance with solid sorption heat pumps. A plurality of valve-less hermetically individual trisorption modules are mounted in a rotating frame, and frame rotation interposes the respective sorption zones appropriately and successively in heat transfer fluid conduits conveying hot, moderate, or cold temperature fluids.

The limitation of the above-cited application is the large rotating mass, albeit at a very slow rotation. The large rotating mass requires large bearings and large heat transfer fluid seals. Also, when conditioned air is one of the heat transfer fluids, there may be a need for a double wall boundary to preclude releases of $NH_3$ at irritant levels. Use of liquid heat transfer fluid may be difficult with the large seals. With gaseous heat transfer fluids, it is more difficult and expensive to convert from winter heat pump mode to summer cooling mode, and also from trisorption (multi-effect) mode to single effect.

What is needed, and included among the objects of this invention, are apparatus and corresponding process for at least one of heat pumping and refrigeration which achieve the high COP multi-effect performance characteristic of the trisorption cycle in simple and reliable equipment which has no refrigerant pumps or valves, no sorbent-to-sorbent heat exchange, and which has continuous and nearly constant delivery of heating and/or cooling. There should be only a minimum number of control mechanisms or moving parts (e.g., valves) in the heat transfer loops, preferably only one or two for fluid distribution, plus when desired one for heating/cooling changeover and one for single effect/multi-effect changeover. There should be no large moving assemblies—the only moving parts being the three or fewer control mechanisms plus any required motive mechanisms (pumps or fans) for the heat transfer fluids. The movable heat transfer fluid distributor mechanism preferably has a reliable and simple seal face. The apparatus preferably should have no critical height or orientation requirement, and not rely on gravity for maintaining critical vapor-liquid interfaces or liquid drains. It should be modular, whereby a refrigerant leak from one module will not cause the entire apparatus to cease function.

DISCLOSURE OF INVENTION

In its most basic aspect, this invention comprises the combination of at least three stationary trisorption modules, at least three heat transfer fluid circuits (at least one each at hot temperature, moderate temperature, and cold temperature), and at least one movable distributor mechanism (including appropriate interconnections). Each trisorption module is a valveless hermetic enclosure having three sorption zones: a high affinity sorbent, a medium affinity sorbent, and a third zone which may alternate as condenser and evaporator of the sorbate (refrigerant), or may contain a third (low affinity) sorbent. The distributor connects at least six of the nine sorption zones at a time to the various heat transfer fluids: two to cold, three to moderate, and one to hot. Distributor motion sequences all zones through the three-step process comprising the trisorption cycle.

More specifically, the invention comprises a heat-actuated heat pump for the continuous production of at least one of heating and cooling comprised of: a) at least three trisorption modules (TM), each TM comprised of a hermetically sealed container for a gaseous refrigerant, said container comprised of three zones of differing chemical affinity for said refrigerant, and at least two of said zones containing solid sorbents; b) a first distributor section adapted to connect each of said high affinity zones sequentially in heat exchange relationship with a first moderate temperature heat transfer fluid; a hot temperature heat transfer fluid; and an idle fluid; c) a second distributor section adapted to connect each of said medium affinity zones sequentially in heat exchange relationship with a first cold temperature heat transfer fluid, an idle fluid, and a second moderate temperature heat transfer fluid; d) a third distributor section adapted to connect each of said low affinity zones sequentially in heat exchange relationship with an idle fluid, and a third moderate temperature heat transfer fluid, and a second cold temperature heat transfer fluid; and e) at least one means for positioning said distributor sections, said means adapted to coordinate the movement of the respective sections whereby when the first distributor section connects the first moderate temperature heat transfer fluid to a given TM, the second distributor section connects the first cold fluid to the same TM, and the third distributor section connects the idle fluid to the same TM.

Beyond the most basic aspect as defined above, the invention also extends to more refined versions which incorporate one or more additional advantageous features including the following examples:

The modules may be three-legged assemblies which are inserted into heat transfer fluid (HTF) conduits which are embedded in insulating material, with one or two HTF connections to each conduit. The number of TMs can be a multiple of three, arranged to provide multiple starts during each step, thus resulting in a more steady heat generation rate. The TMs can be paired with three conduit cross connects, whereby only one HTF connection is required to each conduit, thus simplifying the connection process. The flow of HTF to a zone of a TM can be caused to vary throughout the step by varying the size of the feeder slot and/or return slot of the distributor mechanism, thus more efficiently utilizing the HTF motive power. The high affinity zone HTF can be kept hermetically separate from that of the medium and low affinity zones, thus enabling it to have different additives to accommodate a different temperature regime, or even allowing it to be a different phase. The distributor seal mechanism is preferably a single sliding face, either flat or cylindrical, with a compliant and low conductivity material on at least one of the faces. A single flat-faced seal distributor which is spring loaded can be used for all zones of the TMs.

The preferred sorbates are $NH_3$, $H_2$, $H_2O$, or methanol, and the preferred sorbents are those solids which form coordination compounds with the sorbates. The alkaline earth halides and transition metal halides provide especially attractive sorbent characteristics. The sorbing triads disclosed in the above-cited patent application are all applicable.

The preferred sorbing triad for space conditioning applications includes $SrBr_2$ as the high affinity media, $SrCl_2$ as the medium affinity media, and liquid $NH_3$ as the low affinity sorbing media. Various substitutions are possible for each of these, for example $BaCl_2$ for $NH_3$; $CaCl_2$ for $SrCl_2$; and any of $MnCl_2$, $FeCl_2$, or $CaBr_2$ for $SrBr_2$. Various hydride groupings also show promise as sorbing triads for space conditioning. For higher temperature heat pumping applications, the hydrates are preferred.

BEST MODE FOR CARRYING OUT THE INVENTION

Figure 1:
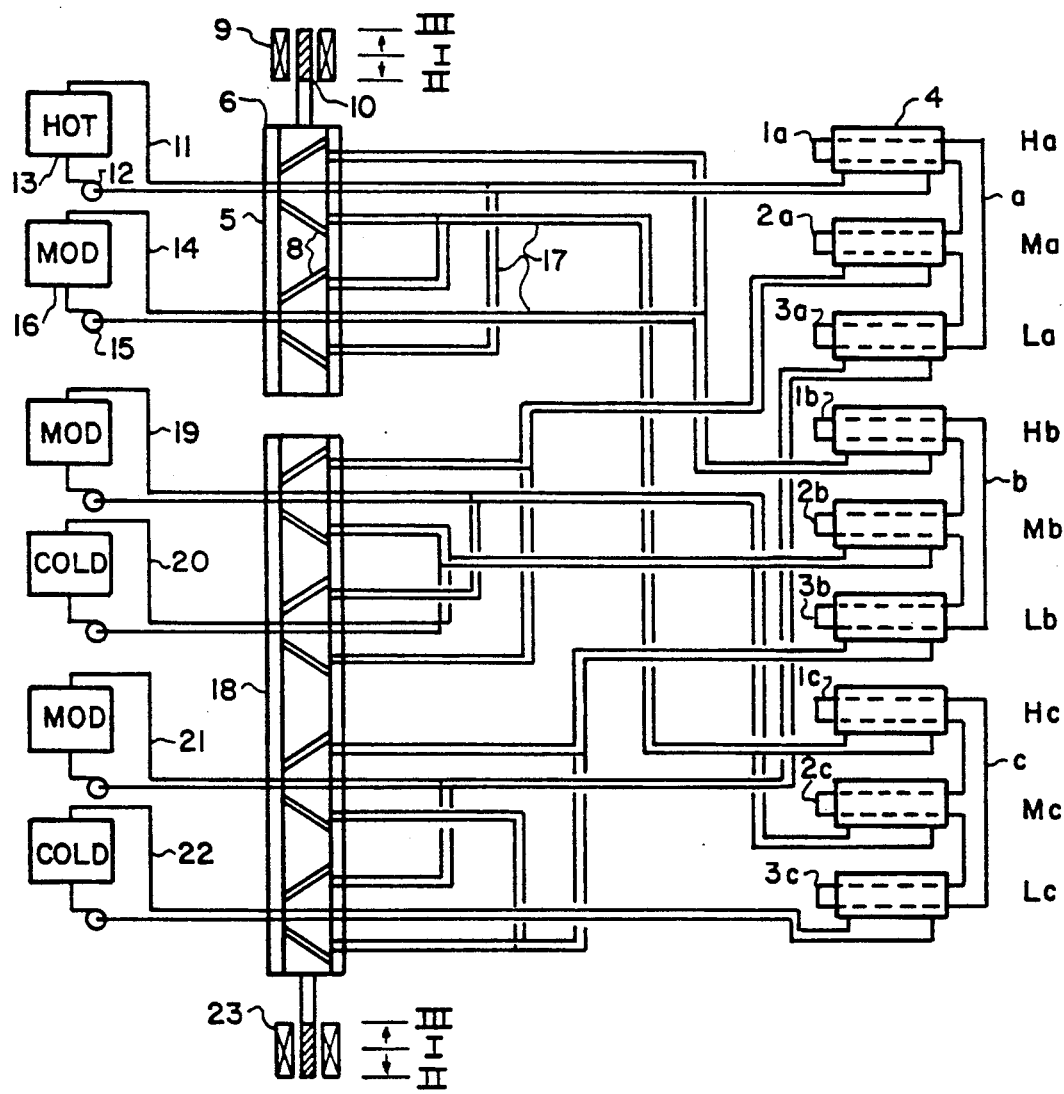
FIG. 1 illustrates the three-module version of the disclosed invention, with linearly actuated distributors. The low and medium affinity distributors are shown combined, and all the HTF circuits are individualized.

Referring to FIG. 1, three trisorption modules (TMs) are shown (a, b, c), each one having a high affinity sorption zone 1 (i.e., a zone wherein heat and mass transfer occurs with a high affinity sorbent); a medium affinity sorption zone 2, and a low affinity sorption zone 3. Each of the three zones for each of the three modules includes a heat transfer fluid (HTF) conduit 4 for indirect exchange of heat with the associated zone. Distributor section 5 alternately supplies hot temperature HTF and moderate temperature HTF to each of the conduits 4 of the high affinity sorption zones 1a, 1b, and 1c. The distributor is comprised of stationary member 6, which accepts all of the fixed piping connections, and sliding cylindrical member 7, which aligns different ports 8 between inlet and outlet piping dependent on its position. Sliding member 7 is actuated by electromagnetic actuator 9 acting upon magnet 10 (or other equivalent means for effecting linear motion). The respective hot temperature and moderate temperature HTFs are made available respectively by circuit 11 comprised of pump 12 and heat exchanger 13, and circuit 14 comprised of pump 15 and heat exchanger 16. The interconnecting piping 17 between distributor section 5 and HTF conduits 4 consists of a supply and return connection to each conduit.

Distributor section 18 shows a combined distributor for both the medium affinity sorption zones 2a, 2b, 2c, and the low affinity zones 3a, 3b, 3c. The medium affinity zones are sequentially connected to either the second moderate temperature HTF circuit 19, or the first cold temperature HTF circuit 20. The low affinity zones are sequentially connected to either the third moderate temperature HTF circuit 21, or the second cold temperature HTF circuit 22. Actuator 23 for distributor 18 is synchronized with actuator 9 for distributor 5, and each has three positions: centered (I), down (II), or up (III). When both are centered, as depicted in FIG. 1, TM "a" has hot heat supplied to its high affinity zone, 1a, moderate heat removed from its low affinity zone 3a, and the medium affinity zone 2a is idle. Likewise TM "b" has cold temperature heat supplied to medium affinity zone 2b, moderate temperature heat removed from high affinity zone 1b, and zone 3b is idle. Finally, TM "c" has moderate temperature heat removed from zone 2c via HTF circuit 19, cold temperature heat is supplied to zone 3c via HTF circuit 22, and zone 1c is idle. The three TMs continue this step until the step time is completed, during which time the sorbate in each TM relocates from the zone receiving heat to the zone releasing heat. Then the two actuators move the distributor to the step "II" position, down from the neutral position. In that position, TM "a" has cold heat supplied to zone 3a, moderate temperature heat removed from zone 2a, and zone 1a idle. In the third step (III), the up position, TM "a" undergoes the final step of the trisorption cycle: cold temperature heat is supplied to 2a, moderate temperature heat is removed from zone 1a, and zone 3a is idle. Similarly the other two TMs complete their cycle, one a step ahead of TM "a", the other a step behind.

Thus quasi-continuous heat pumping at multi-effect efficiency is accomplished with stationary modules containing no refrigerant valves or pumps, in an apparatus containing only two moving HTF parts (not counting the pumps) to accomplish all required HTF distribution. Clearly two or even all three of the moderate temperature circuits can be combined into a single pump and heat exchanger, and similarly both cold temperature circuits can be combined, to further simplify the system.

Whereas FIG. 1 illustrates the essential features of the invention, it has the limitation that the power delivery is not steady, due to the known characteristic of solid sorbents undergoing sorption with combined heat and mass transfer. In order to make the power levels (heat transfer delivery rates) more steady, it is necessary to have more "starts" per step. For example, when three TMs reach the halfway point of their respective steps, three new TMs start the same steps. Thus as the heat release rate of the halfway TMs starts to taper off, the new TMs commence the same steps with their compensating higher release rates, and the overall sum of heat release is much steadier.

Each additional start per step requires three additional TMs. In several respects the larger number of TMs is advantageous. Up to a point, as the TM size decreases, the surface to volume ratio improves (more heat transfer surface per contained volume of sorbent). Also internal distances decrease. This reduces heat transfer as a kinetically limiting process, and approaches the intrinsic mass transfer limit. That is, shorter step times and cycle times are realized, and the entire apparatus becomes more compact.

The preferred cycle times are in the approximate range of 2 to 30 minutes, and the preferred TM zone diameters are in the approximate range of 1 to 10 centimeters.

A multiplicity of TMs also presents the advantages that a leak in one results in only a negligible release of refrigerant, and has a negligible detrimental effect on apparatus operation.

Figure 2:
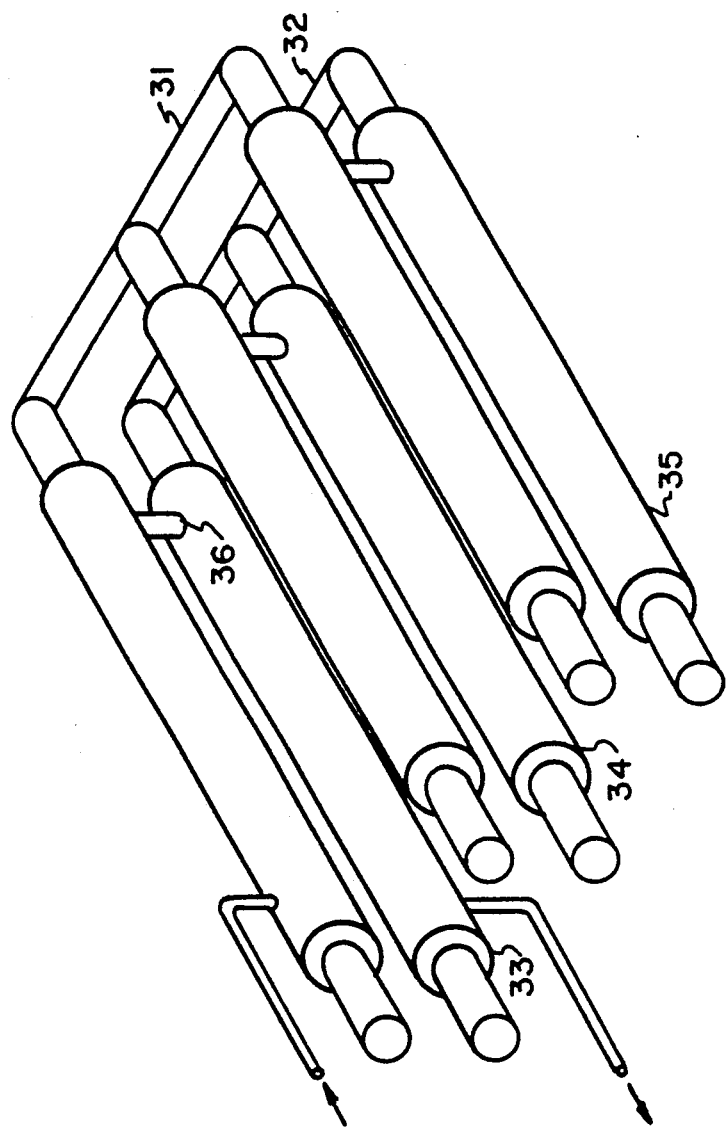
FIG. 2 illustrates the combination of two TMs in interconnected conduits, whereby the required number of piping connections is halved.

One disadvantageous effect of a multiplicity of TMs is the increased number of connections which must be made to the distributor during manufacture. FIG. 2 illustrates one way to reduce the connections from two per TM zone to one per TM zone.

TMs 31 and 32 are paired by three sets of heat transfer conduits 33, 34, 35, one pair respectively for the high affinity zones, medium affinity zones, and low affinity zones. Cross connects 36 at one end of each conduit pair eliminate the corresponding external connections to the conduits.

Figure 3:
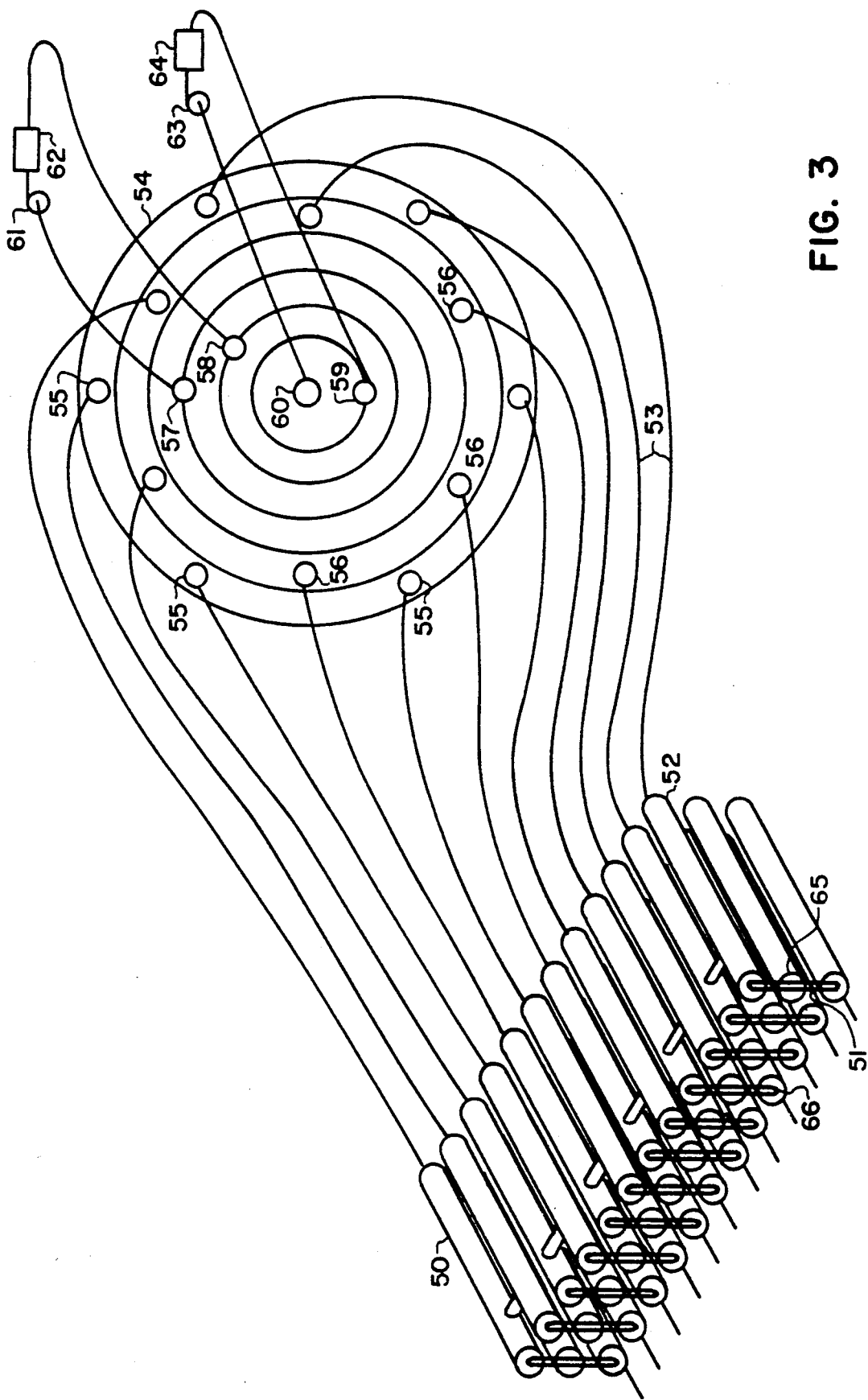
FIG. 3 illustrates a bank of 12 TMs served by two rotary distributors, with two cold temperature HTF circuits combined, and likewise two moderate temperature ones.

FIG. 3 illustrates an apparatus with two starts per step. The TMs are in the paired configuration of FIG. 2, so it takes 12 TMs (six pairs) to achieve two starts per step.

If linearly actuated distributors are used for multiple starts per step, three new distributor sections (and associated actuator) are required for each start. By alternatively providing the rotary distributor 54. Any number of starts can be accommodated by a single distributor and single drive mechanism.

In FIG. 3, a block 50 of 12 paired TMs 51, each pair with associated interconnected conduits 52, and with insulation between all the conduits, has piping connections 53 extending from all twelve high affinity media zones to the stationary plate 54 of a rotary distributor. The six supply connection points 55 are evenly spaced circumferentially at a large radius, and the six return connection points 56 are located circumferentially at a smaller radius. Four additional radial locations, each at a different radius, have respective connecting points for hot temperature HTF supply (57), hot temperature HTF return (58), moderate temperature HTF supply (59), and moderate temperature HTF return (60). The hot temperature HTF circuit is completed by means for HTF circulation 61 and source of hot temperature heat 62, and similarly the moderate temperature HTF circuit is completed by means for HTF circulation 63 and moderate temperature heat sink 64.

The twelve medium affinity zones 65 are similarly connected to a rotary distributor (not shown) served by moderate and cold temperature HTF circuits, and likewise for the twelve low affinity zones 66. These two latter rotary distributors can be combined into a single one which shares a common supply and return port for each HTF circuit, rather than duplicating them.

Figure 4A:
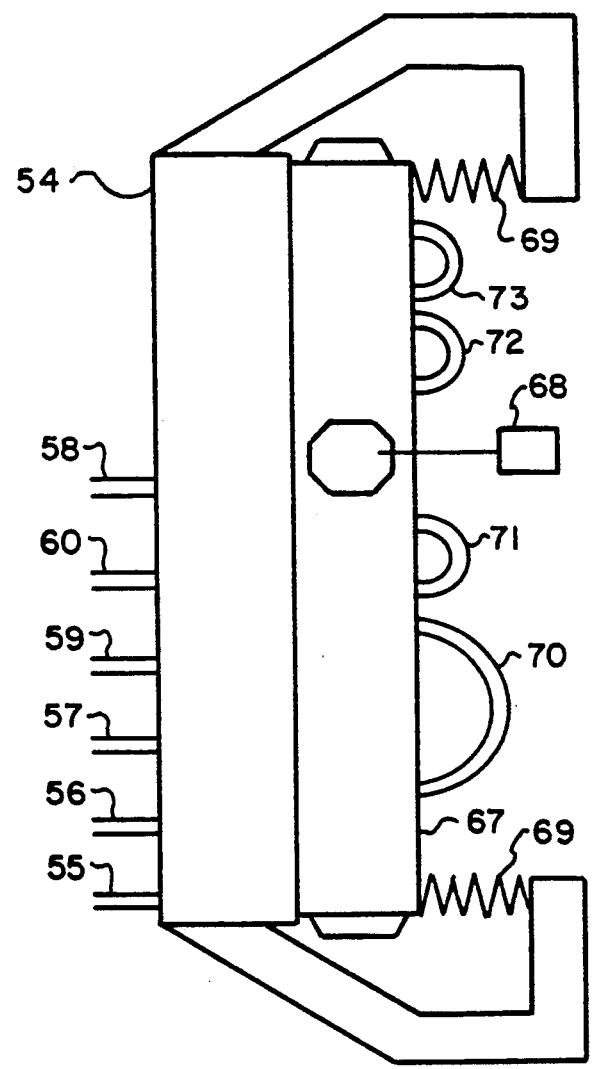
FIGS. 4a and 4b show details of one of the rotary distributors from FIG. 3.
Figure 4B:
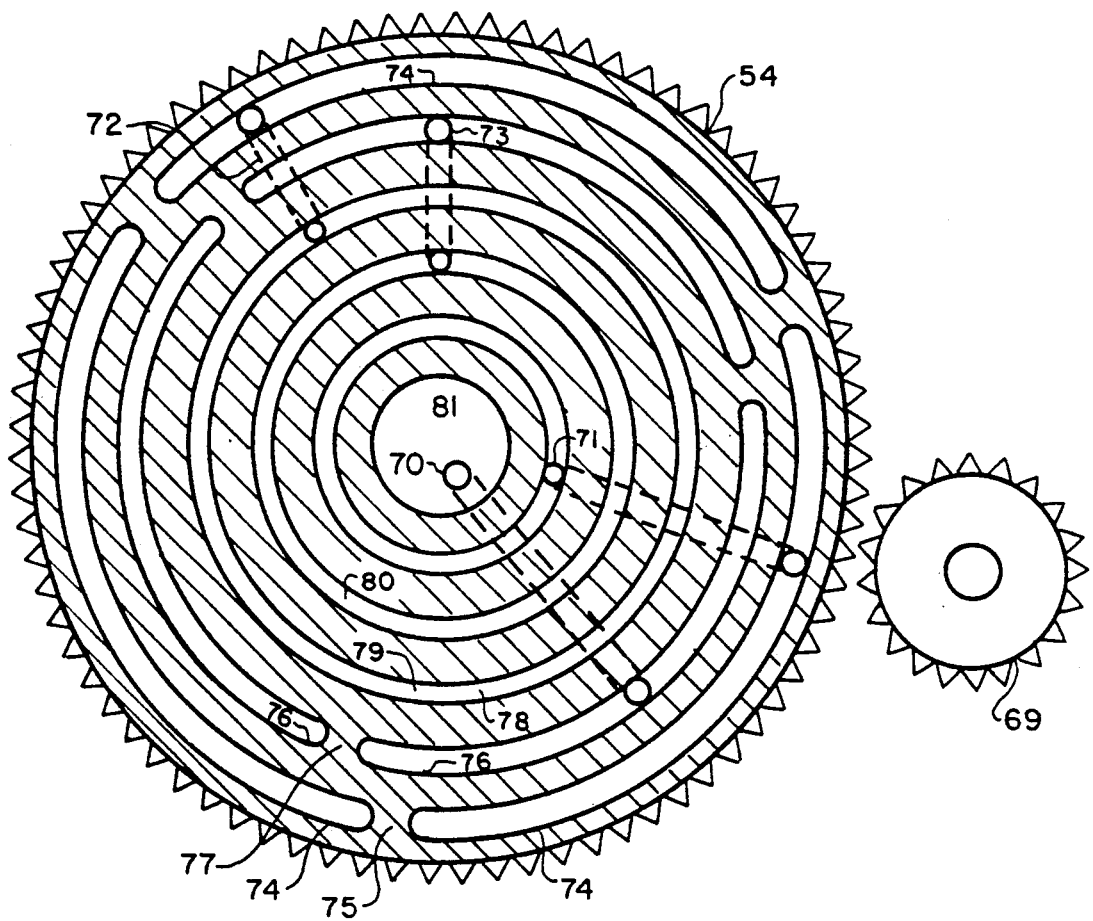

Additional details of the preferred rotary distributor are provided in FIGS. 4a and 4b. FIG. 4a is a side view showing the stationary plate 54 with a representative connection point 55 and 56, and also the respective HTF circuit connecting points 57, 58, 59, and 60. Also shown is rotating member 67 which has a flat face which slides against a flat face of stationary member 54, and a means for rotation 68 which causes it to rotate.

There is a means for tensioning 69 the moving face of rotating member 67 against the stationary face of stationary member 54, in order to effect a better seal, and decrease any leakage of HTF. The tensioning device 69 may be springs as illustrated, or other known means. There may also be intraconnections 70, 71, 71, 72 on the back face of rotating member 67.

FIG. 4b is a front view of rotating member 67 from the flat sliding seal face side. The rotational drive mechanism 68 is shown, in this case as a gear and pinion drive. The cross hatched area is the actual flat sealing face, and numerous circumferential grooves are inscribed in it at differing radii. At the largest radius, the grooves are comprised of three equal segments 74, interrupted by blocking sections 75. These grooves are at the same radius as the six connection points 55 in stationary member 54. Each connecting point is drilled through the stationary member so there is a corresponding port on the inner (seal) face. Thus the six ports 55 will always be aligned with grooves 74, two to each groove segment except for those brief periods when a port aligns with one of the blocking sections 75.

Similarly the three groove segments 76 align with the ports associated with connection points 56, except when blocked by blocking sections 77.

The four inner grooves 78, 79, 80, 81 in the seal face of rotating member 67 extend the entire circumference. They are located at radii which cause them to align respectively with the ports associated with connection points 57, 58, 59, and 60. Finally intraconnections 70 and 71 connect the moderate temperature HTF circuit supply and return to one each of groove segments 74 and 76, and intraconnections 72 and 73 connect the hot temperature HTF circuit supply and return to different segments of grooves 74 and 76. The remaining pair of groove segments has no intraconnection, thus the TM zones aligned with those segments are idle.

Additional features may be present beyond the simple distributor design described above. Clearly more TMs can readily be accommodated by increasing the number of connection points 55 and 56. Higher flows can be accommodated by having multiple parallel intraconnects in place of each individual intraconnect 70, 71, 72, 73. The HTF flow to or from a given TM zone can varied over the step duration by varying the width of the groove segment 74 or 76 from one end of the segment to the other.

Alternative rotary distributor designs can be employed with this stationary trisorption heat pump. For example, the distributors disclosed in U.S. Pat. No. 4,372,376 for use with a single effect stationary modular hydride heat pump could be used, provided the module grooves are modified to three equal segments. However, that design has two sliding seal faces in each distributor, and the one disclosed herein has only one. Note that the distributor disclosed herein is also applicable to single effect sorption heat pumps when the module grooves are comprised of two equal segments vice three.

Figure 5:
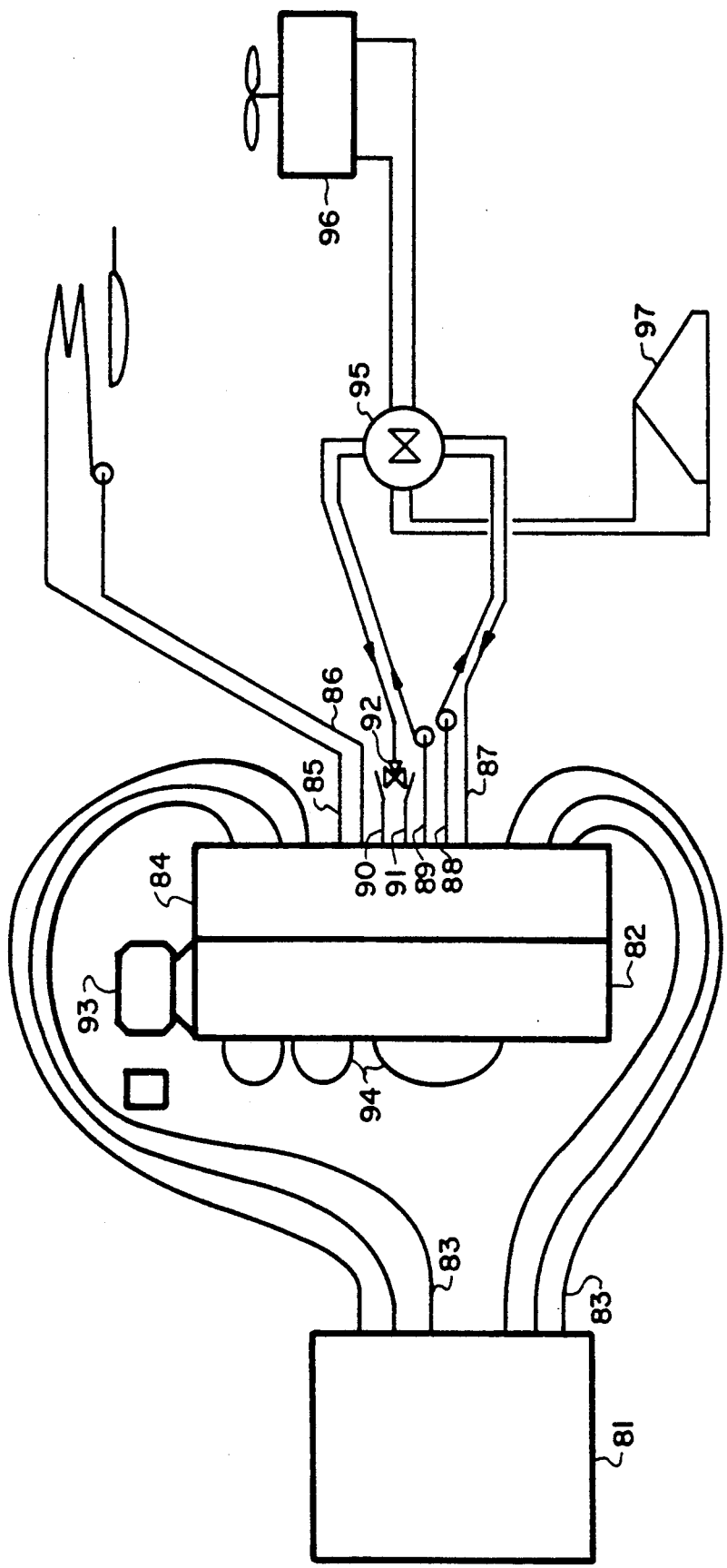
FIG. 5 shows a stationary trisorption heat pump (S3HP) with a single rotary distributor having only a single flat sealing face, and with only three HTF circuits. A heating/cooling change valve is in the cold and moderate temperature HTF circuits, and a single effect/multieffect three-way valve is in the moderate temperature HTF circuit.

FIG. 5 illustrates a particularly full-featured yet simplified version of the disclosed stationary trisorption heat pump. An insulated block 81 of TMs plus associated conduits is connected to distributor 82 via connections 83. All three affinity zones are connected to the single distributor, thus taking the example of 18 paired TMs (three starts per step) there are a total of 54 TM connections to distributor 82. They are connected at six radii, nine connections in each circle (most connections are not shown for ease of illustration). There are also seven HTF circuit connections to stationary member 84: hot temperature supply and return (85, 86), cold temperature supply and return (87, 88), and moderate temperature return (89) and a selection of two moderate temperature supplies (90, 91) dependent on the position of three way valve 92. Rotational mechanism 93 causes rotating member 94 to rotate. The rotating member contains thirteen circumferential grooves at differing radii. Six of them are for the TM ports, a supply and return groove for each affinity. Those six grooves are segmented into three equal sections. The hot and cold HTF supply and return each have a groove, as does the moderate return. There are two grooves for moderate supply, one each for common connection 90 and alternative connection 91. Finally the distributor has 14 intraconnects on the back face of moving member 82.

Each of the segmented grooves gets two intraconnects, except for two (the high affinity zone supply and return grooves) which each get a third. In one position of valve 92 the high affinity zone is supplied moderate temperature HTF at its normal time, and from the common moderate temperature HTF supply groove. In the other position of that valve, the alternative moderate temperature HTF supply groove supplies the high affinity groove at the same time that the same TM has cold HTF supplied to its low affinity zone. This changes the TM to single effect operation.

Summer-winter change valve 95 is provided to interchange outdoor coil 96 and indoor coil 97 to either cold or moderate temperature HTF circuit, to change between heating mode and cooling mode.

I claim:

1. A heat-actuated heat pump for the continuous production of at least one of heating and cooling comprised of:
   a) at least three trisorption modules (TM), each TM comprised of a hermetically sealed container for a gaseous refrigerant, said container comprised of three zones of differing chemical affinity for said refrigerant, and at least two of said zones containing solid sorbents;
   b) a first distributor section adapted to connect each of said high affinity zones sequentially in heat exchange relationship with a first moderate temperature heat transfer fluid; a hot temperature heat transfer fluid; and an idle fluid;
   c) a second distributor section adapted to connect each of said medium affinity zones sequentially in heat exchange relationship with a first cold temperature heat transfer fluid, an idle fluid, and a second moderate temperature heat transfer fluid;
   d) a third distributor section adapted to connect each of said low affinity zones sequentially in heat exchange relationship with an idle fluid, and a third moderate temperature heat transfer fluid, and a second cold temperature heat transfer fluid; and
   e) at least one means for positioning said distributor sections, said means adapted to coordinate the movement of the respective sections whereby when the first distributor section connects the first moderate temperature heat transfer fluid to a given TM, the second distributor section connects the first cold fluid to the same TM, and the third distributor section connects the idle fluid to the same TM.

2. Apparatus according to claim 1 further characterized by at least two of said distributor segments being combined in a single mechanism which is comprised of a rotating member.

3. Apparatus according to claim 2 further characterized by said rotating member having a single flat sealing face.

4. Apparatus according to claim 1 further characterized by said solid sorbents being selected from the list comprised of ammoniates, hydrides, hydrates, and methanolates.

5. Apparatus according to claim 1 further characterized by said low affinity media zone being adapted for condensation and evaporation of said sorbate.

6. Apparatus according to claim 2 additionally characterized by at least six TMs, and by said rotary distributor having three equal segments for connection to TM zones each rotation, said segments separated by blocking sections which prevent mixing of different temperature HTFs.

7. Apparatus according to claim 1 additionally characterized by an alternative moderate temperature HTF connection for said high affinity zones, plus a control valve in said moderate temperature HTF circuit which controllably connects either the normal or alternative connection.

8. Apparatus according to claim 1 additionally characterized by at least 18 TMs which are connected to a single rotary distributor, plus a summer-winter change valve connecting the cold and moderate temperature HTF circuits to respective indoor and outdoor means for heat exchange.

9. A heat pump comprised of:
   a) at least three stationary valveless three-zone modules, at least two of said zones containing solid sorbents of respective high and medium affinity for a gaseous refrigerant contained in each module;
   b) at least one means for distributing at least three heat transfer fluids (hot temperature, at least one moderate temperature, and cold temperature) in controlled sequence to said modules; and
   c) flow passages in said means for distributing which simultaneously connect the high affinity zone of one module to one of the moderate temperature heat transfer fluids; the medium affinity zone of another module to one of the moderate temperature heat transfer fluids; and the third zone of yet another module to one of the moderate temperature heat transfer fluids.

10. An apparatus for distribution of at least two heat transfer fluids to a multiplicity of heat exchange zones each zone comprised of a hermetically enclosed sorbent media for a gaseous sorbate, and in sorbate communication with at least one other zone, characterized by:
    a) a stationary member which is flat on one side; and which has at least one piping connection to each zone plus a pair of piping connections for each heat transfer fluid; and which has a port in the flat side for each piping connection;
    b) a rotating member which is also flat on one side, and which has elongated grooves in the flat side which are adapted to align with differing groupings of said ports dependent on the rotational position of said rotating member, and which has at least one internal crossconnect for each of said grooves;
    c) a means for tensioning said rotating member which holds the rotating flat face in sliding seal relationship against the stationary flat face; and
    d) a means for rotating said rotating member.

11. The apparatus according to claim 10, further characterized by:
    a) each of said zones being in sorbate communication with two other zones, and the grooves in said distributor comprised of three equal segments such that each zone experience a three step sequence during one rotation of said rotating member.

12. A process for at least one of heating and cooling characterized by:
    a) supplying at most two means for distribution of heat transfer fluids, and at least three trisorption modules comprised of high, medium, and low affinity sorbing zones hermetically enclosed with a sorbate;
    b) distributing hot temperature heat transfer fluid and moderate temperature heat transfer fluid sequentially to said high affinity zones, with an idle period between hot and moderate distribution;
    c) distributing moderate temperature and cold temperature heat transfer fluid sequentially to said medium affinity zones and to said low affinity zones, with an idle period after cold distribution; and
    d) providing at least one of heating from said moderate temperature HTF and cooling from said cold temperature HTF.

* * * * *